United States Patent [19]
Young et al.

[11] Patent Number: 5,307,939
[45] Date of Patent: May 3, 1994

[54] SCREENING APPARATUS FOR PAPERMAKING PULP

[75] Inventors: Douglas L. G. Young; Oscar Luthi, both of Nashua, N.H.

[73] Assignee: Ingersoll-Rand Company, Woodcliff Lake, N.J.

[21] Appl. No.: 912,462

[22] Filed: Jul. 13, 1992

[51] Int. Cl.$^5$ ............................................. B07B 1/22
[52] U.S. Cl. ............................ 209/270; 209/273; 209/281; 210/414; 210/415
[58] Field of Search ............... 209/273, 413, 415, 270, 209/281; 210/413, 414, 415

[56] References Cited

U.S. PATENT DOCUMENTS

| | | | |
|---|---|---|---|
| 3,762,563 | 10/1973 | Petersen | 209/273 X |
| 4,188,286 | 2/1980 | Holz | 209/273 |
| 4,193,865 | 3/1980 | Aario | 209/273 X |
| 4,200,537 | 4/1980 | Lamort | 210/415 |
| 4,238,324 | 12/1980 | Musselmann et al. | 209/273 X |
| 4,356,085 | 10/1982 | Schön et al. | 209/273 |
| 4,374,728 | 2/1983 | Gauld | 209/273 |
| 4,676,903 | 6/1987 | Lampenius et al. | 210/413 |
| 4,749,474 | 6/1988 | Young | 209/273 |
| 4,832,832 | 5/1989 | Fujiwara et al. | 209/273 |
| 4,855,038 | 8/1989 | LeBlanc | 209/273 |
| 4,950,402 | 8/1990 | Frejborg | 210/413 |
| 5,000,842 | 3/1991 | Ljokkoi | 209/273 |
| 5,051,168 | 9/1991 | Hautala | 209/273 |
| 5,059,324 | 10/1991 | Chen | 209/273 X |
| 5,147,543 | 9/1992 | Frejborg | 209/273 X |
| 5,172,813 | 12/1992 | Ljokkoi | 209/273 X |
| 5,176,261 | 1/1993 | Holz | 209/273 |
| 5,192,438 | 3/1993 | Frejborg | 209/273 X |

*Primary Examiner*—D. Glenn Dayoan
*Assistant Examiner*—Dean A. Reichard
*Attorney, Agent, or Firm*—Robert F. Palermo

[57] ABSTRACT

A hydrodynamic device for generating negative pressure excursions in a pulp slurry during fine screening, includes at least one half-foil member disposed on a substantially cylindrical outer surface of a rotor. The rotor is mounted within and co-axial with a substantially cylindrical screen having a circumferentially continuous apertured zone to define an annular screening chamber between the rotor and the screen. The half-foil member is collectively at least axially co-extensive with the apertured zone and has a leading edge which, also collectively, is inclined at a spiral angle relative to the axis of the rotor such that, in one embodiment, during rotation, the leading edge of the half-foil member conducts large particles downwardly through the screening chamber. A selection of hydrodynamic foil configurations is provided in order to adapt to a wide range of pulp types and screening conditions.

10 Claims, 5 Drawing Sheets

SCREENING APPARATUS FOR PAPERMAKING PULP

BACKGROUND OF THE INVENTION

This invention relates generally to machinery for screening paper-making pulp and more particularly to a screening apparatus having an enhanced rotor for promoting screening efficiency together with power conservation.

The quality of pulp is, to a large extent, determined by its freedom from contamination with shives, woody particles, dirt, and coarse fibers.

Shives and woody particles are usually small fiber bundles which are held together by a small amount of undigested lignin. Their presence to excess in commercial pulp results in reduced value and may cause downgrading of the pulp.

Dirt may be of organic or inorganic composition. Inorganics include small pieces of sand or other grit, while organics may be residual particles of bark or pitch agglomerations. Typically, these are visible to the unaided eye and are usually of a different color from the pulp. Since they all have various adverse effects, they also cause downgrading of the pulp and a consequent reduction of value.

The presence of any or all of these is undesirable, and many techniques for their separation have been developed with widely varying operating success records. These usually involve screening performed in a chamber in which relative motion is created between the screen and some agitation device such as a rotor or a hydrodynamic foil, one of which may be movable. The most common shortcomings of available separation machines are their inability to remove sufficient shives without also removing an undesirable quantity of good fiber; the tendency to block the screen with anything other than the lowest consistency of pulp; the tendency for the liquid component of the pulp suspension to pass more readily than the fibers through the screen, resulting in a progressive increase of consistency from the pulp feed to rejects discharge which results in unstable operation of the screening apparatus; the damage and wear caused to the screen and rotor by coarse particles caught between them; the consumption of excessive power for supplying the pulp and for screening; and the progressive damage to the pulp fibers caused by dissipation of the excessive energy used in the process.

Ideally, a screening apparatus would remove all shives and foreign particles from high consistency pulp without any of the good fibers being lost; without requiring any addition of dilution liquor; and without more than the minimum consumption of energy. In reality, employment of a screen with perforations fine enough to remove all undesirable material usually results in frequent screen blockages and possibly even jamming of the pulp between the rotor and the screen. Use of a screen coarse enough to prevent blocking and jamming usually results in accepting nearly all the undesirable particles. To avoid both of these objectionable results, screen aperture sizes are chosen to be slightly larger than that at which unstable operation occurs. To minimize unstable operation, agitation is provided to ensure that fibers pass individually through the screen apertures, and screenplate cleaning is typically provided by backwashing accumulated particles out of the apertures.

It has become quite common to use a screen/rotor combination for agitation and for hydrodynamic generation of backwash pulses in a fine screening apparatus. The aperture size, pulse generator form and size, rotor form and speed, and rotor/screen separation, for a given pulp type and consistency, determine the screening behavior. In some cases, positive pressure pulses may be too strong and too long relative to the negative pressure backwash pulses and may result in marginally rejectable fibers being extruded through the screen apertures and passing back and forth through the screen many times. This may damage the fibers by removing secondary fibrils and may result in paper having low strength. It also consumes excessive energy by causing multiple unnecessary screen passes for accepts fiber, which thereby reduces production capacity.

Some machines have a cage type rotor which may consist of one or more hydrodynamic foil members, mounted on support arms which radiate from a rotatable hub, extending axially for the full length of the screen. These generate strong pulses which sweep around the circumference over the full length of the screen with every revolution of the rotor. Such rotors consume excess power due to stirring action on the pulp residing inboard of the foil members. This power is wasted because it does not contribute sufficiently to the screening action.

One improvement to the cage type rotor provides a large diameter hub on which the hydrodynamic foils are mounted on short support arms to reduce the volume of the screening chamber and to reduce specific power consumption.

To reduce the magnitude of the effects described above, many machines are now made with closed rotors, that is, rotors having a full cylindrical surface on which bumps and depressions are directly attached without support arms to generate localized pressure pulsations. Depending upon their specific geometries, these may offer lower specific power consumption than cage rotors; and, because the bumps and depressions are distributed over the rotor surface, the pressure pulsations are distributed about the screen plate surface and do not concentrate alternating stresses along the aperture pattern.

Although these and other modifications have improved screening economics, there is still room for very significant improvement in screening before diminishing-returns sets in. For example, depending on the pulp characteristics in the particular pulp line, it is possible to tailor the numbers, shapes, locations, and sizes of the bumps and depressions to provide pulses of different durations, intensities, frequencies, and shapes which maximize screening efficiency and discrimination ability while reducing or minimizing power consumption.

Until these improvements are realized, fine screening efficiency will be less than desired, and pulp quality will suffer because of failure to remove a sufficient portion of objectionable material. In addition, the waste of good fiber due to its removal with rejects, the damage to fiber quality attributable to excessive mechanical working, and the excessive consumption of power (due to redundant stirring and to excessive dilution required to overcome thickening of the pulp) imposes a significant cost on the pulp making process.

The foregoing illustrates limitations known to exist in present fine screening apparatus. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a hydrodynamic device for generating negative pressure excursions in a pulp slurry during fine screening, including at least one half-foil member disposed on a substantially cylindrical outer surface of a rotor, the rotor being mounted within and co-axial with a substantially cylindrical screen having a circumferentially continuous apertured zone to define an annular screening chamber between the rotor and the screen, the at least one half-foil member having a collective axial extent at least equal to that of the apertured zone and having a collective leading edge of the at least one half-foil member inclined at a spiral angle relative to the axis of the rotor.

The foregoing and other aspects will become apparent from the following detailed description of the invention when considered in conjunction with the accompanying drawing figures.

DETAILED DESCRIPTION

Figure 1:
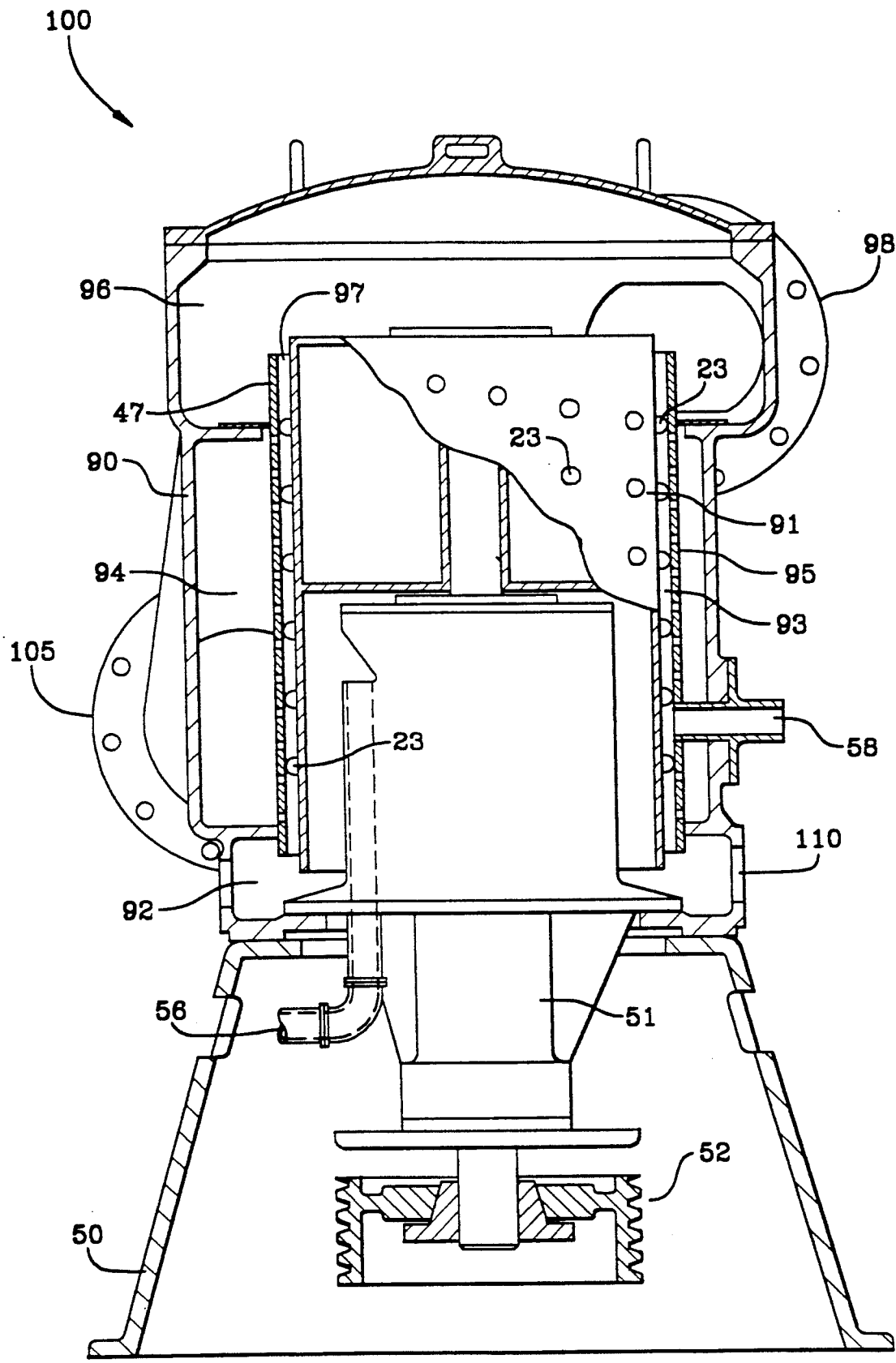
FIG. 1 is a cross-sectional partially fragmentary schematic elevation view illustrating a generalized embodiment of a pulp fine-screening device and the overall structure of a typical such machine.

Referring to FIG. 1, common features of pulp fine-screening equipment can be seen. A screening apparatus 100 is made up of a base 50 upon which housing 90 is mounted. (The apparatus shown here is vertically oriented, but it is known that screening apparatus may be in any orientation between horizontal and vertical.) Housing 90 has an end mounted inlet chamber 96 with a pulp inlet 98 through which pulp is tangentially fed for screening. The pulp flows around and over inlet wall 47 into pulp entrance 97 which is defined by the annular space between the portion of rotor 91 projecting above the perforated portion of screen 95 and inlet wall 47. Rotor 91 has a closed top, a generally cylindrical surface, and, on the portion of the rotor adjacent to the perforated portion of screen 95, in most cases, one or more projections 23 or other surface irregularities for generating negative pressure pulsations. These are intended to help prevent blocking the screen by causing momentary flow reversals through the perforations of the screen 95. The annular space between rotor 91 and screen 95 defines screening chamber 93, while the space outboard of the screen 95 contains accepts chamber 94 which is drained by accepts discharge 105. Below accepts chamber 94 and screening chamber 93 is rejects chamber 92 which empties through rejects discharge 110. Rotor 91 is rotated by a shaft which extends through a sealed center column 51 and which is driven by a prime mover (not shown) through drive pulley 52. Dilution inlets 56 and 58 are also shown. Elimination of one or both of these dilution inlets is one of the purposes of the present invention.

Figure 2:
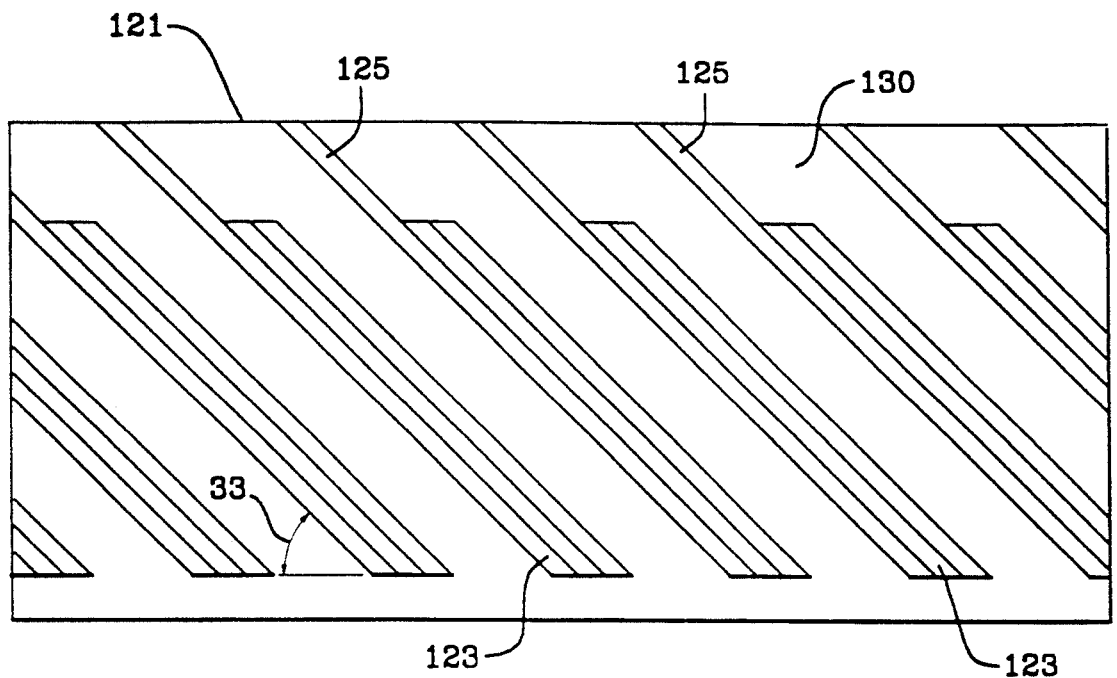
FIG. 2 is a schematic elevation view of a rotor incorporating one embodiment of the surface projections of the present invention as it would appear if the surface were detached from the rotor support frame and unrolled to flatten.
Figure 3:
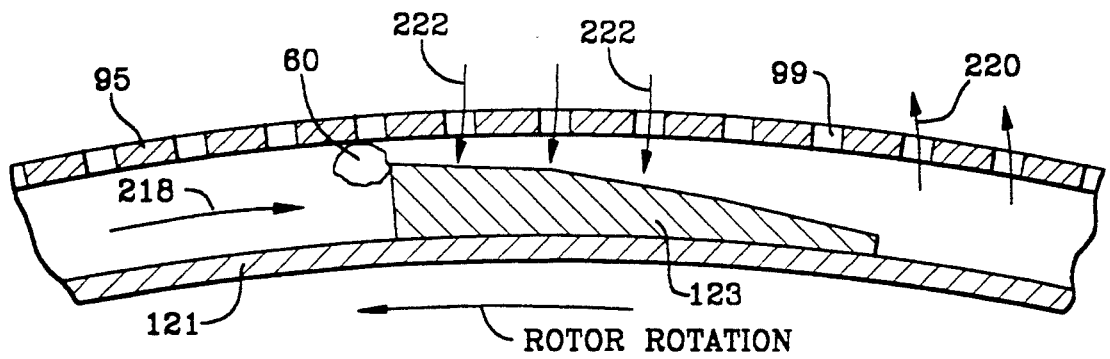
FIG. 3 is a fragmentary plan view of the rotor of FIG. 2 in the "rolled" condition illustrating the relationship between the rotor surface and the screen.

FIGS. 2 and 3 schematically illustrate one embodiment of the pulse generating projections of the present invention as well as a representation of their zone of interaction with a screen. FIG. 2 shows a rotor 121 whose surface 130 has been unrolled to show the plan view appearance of the projections, or half-foils (so termed, since only the radially outer half of the foil stands above the rotor surface), as they would be seen prior to rolling. Half-foils 123 have a uniform spiral angle 33 relative to the axis of the rotor. This spiral angle may be between approximately twenty-five and sixty-five degrees to the rotor axis but is preferably between forty and fifty degrees. Accelerating vanes 125 extend as continuations of the leading edges of foils 123 along the portion of the rotor within pulp entrance zone 97. Note that the projections have straight leading edges as seen on the unrolled rotor surface. Because of the inclination of the leading edges, the projections have a downward pumping effect on the slurry. This maintains flow of the slurry through the screening chamber so that rejects are transported rapidly to the rejects chamber.

Rotor 121 is seen from above in FIG. 3. Screen 95 has apertures 99 through which accepted fiber along with pulp liquor has a normal outflow 220. Because of the rotation of rotor 121, half-foil 123 has a relative velocity 218, with respect to the pulp being treated, lower than its absolute velocity. This is due to the tangential velocity of the pulp within the screening chamber as a result of the stirring action of the half-foil members 123 on the pulp. FIG. 3 demonstrates the operation of the invention. The relative velocity 218 generates a pressure excursion at the screen plate due to a venturi-like effect between foil 123 and screen 95. It begins with a rapid pressure increase immediately prior to the passage of the leading edge of the foil. This is immediately followed by a precipitous pressure drop which gradually tapers back to the equilibrium positive pressure for the screening chamber. This results in a peak negative pressure occurring near the zone of closest proximity between foil 123 and screen plate 95. When superimposed on the constant positive pressure attributable to feed pressure plus height of the slurry above that point on the screen and to the centrifugal force of the circumferential flow of the pulp slurry, the result is a flow reversal which converts outflow 220 into backflow 222. This tends to flush coarse fiber bundles and other particles from the apertures of the screen 95 and to break-up screen blinding caused by entangled fibers. In addition, it also returns pulp liquor having a reduced fiber content to the screening chamber and thereby prevents thickening. This maintains screening efficiency without the need for the addition of dilution liquid.

Another feature of this embodiment is seen in FIGS. 2 and 3 by considering large scale contaminant (or particle) 60 and its interaction with foil 123. The constant spiral angle 33 facilitates rapid downward transport of such contaminants because it does not require any changes of direction and the leading edge of foil 123 is snag-free and smooth. Note that the leading edge of the foil is preferably flat and radially oriented so that it does not tend to push large scale contaminants against the screen where they cause wear and damage and impede rotor motion.

Figure 4A:
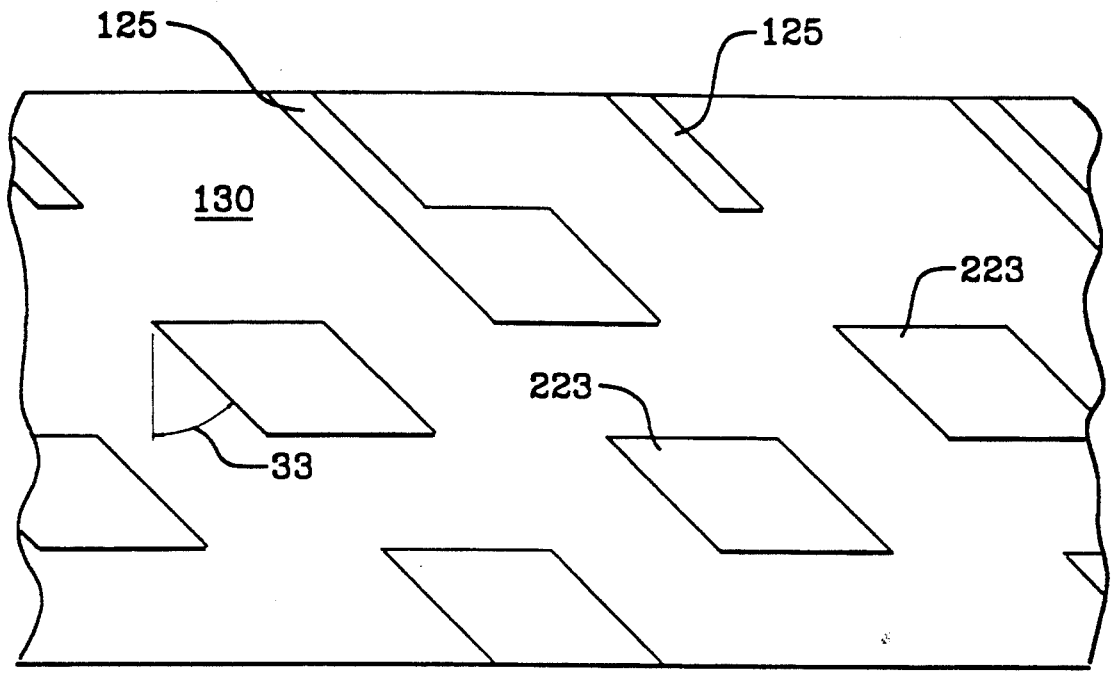
FIGS. 4a and 4b are views, as in FIG. 2, of rotors showing two other embodiments of the rotor surface projections of the present invention.
Figure 4B:
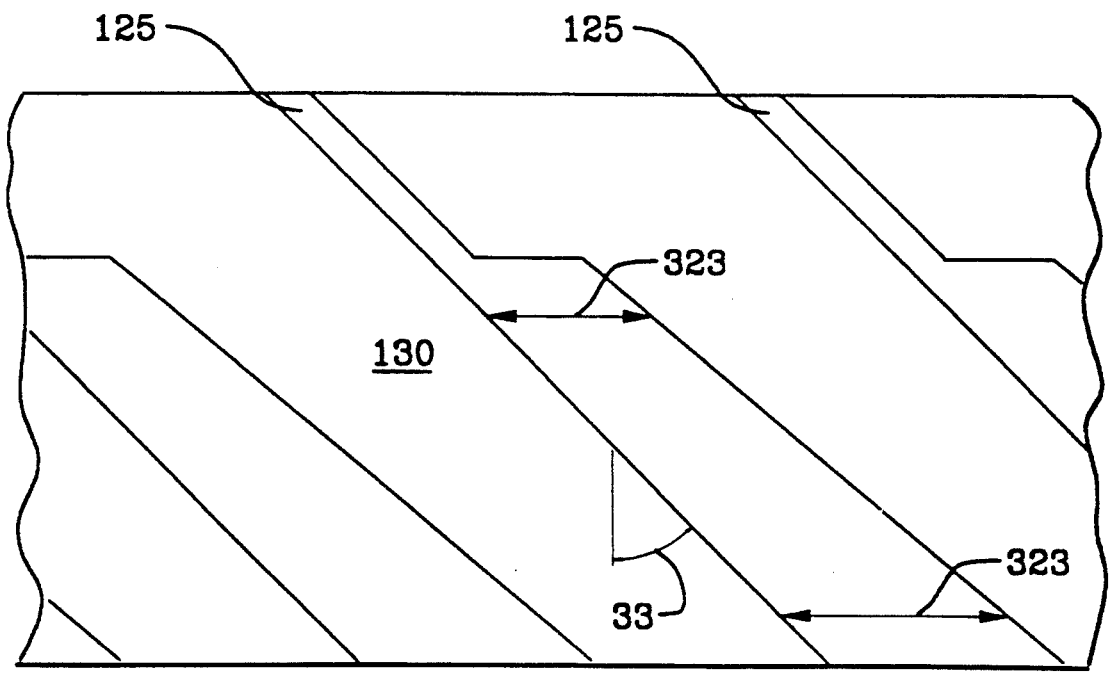

FIGS. 4a and 4b illustrate two further embodiments of the invention in which the leading edge of the foil 223, 323 forms a constant spiral angle 33 with the rotor axis. In FIG. 4a, smooth rotor surface 130 has interrupted foils 223 and accelerator vanes 125 symmetrically disposed on it. Although they are not continuous, the foils, collectively, have the same downward conveying action because of their cascading interrelationships and because of their constant spiral angle. FIG. 4b shows a continuous foil 323 whose circumferential dimension increases continuously with its axial location below the accelerator vanes 125. This dimensional change results in a corresponding increase in the duration of the negative pressure pulsation thereby increasing the amount of backflow of liquor through the screen, but it does not change the spiral angle and does not decrease the effectiveness of downward transport of large scale contaminants 60. The extended duration of the negative pressure pulsation retards thickening by causing backflow of an increasing fraction of the pulp liquor having a reduced fiber content which would otherwise require replacement by dilution.

Figure 5A:
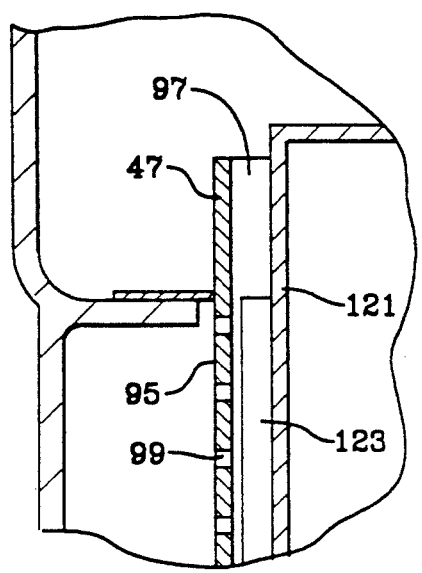
FIGS. 5a, 5b, and 5c are fragmentary sectional elevation views, each showing a screen and a rotor, which incorporates rotor surface projections of the present invention, alone and with two embodiments of accelerator vanes, respectively.
Figure 5B:
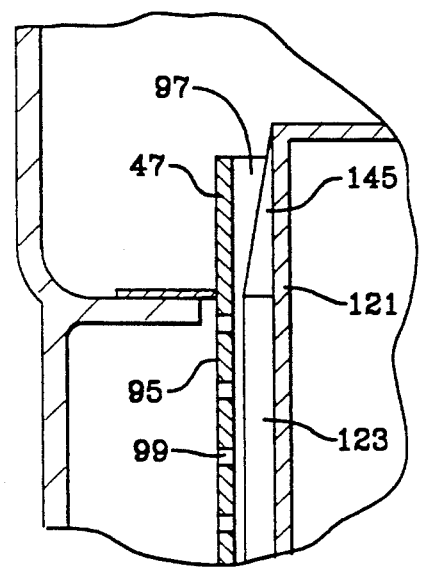
Figure 5C:
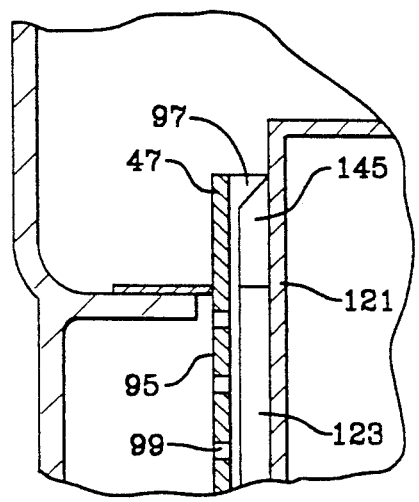

FIGS. 5a, 5b, and 5c show added detail of the accelerator vanes 125 as seen in FIGS. 2 and 4. In these Figs., since the vanes are shown to have different tangential profiles, they are numbered differently. FIG. 5a shows rotor 121 with half-foils 123 adjacent and radially inboard of screen 95 and thereby defining screening chamber 93 as that space bounded by the rotor 121 and the portion of screen 95 having perforations 99. Above screening chamber 93 is pulp entrance zone 97 defined as the annular space between inlet wall 47 and the top portion of rotor 121. The foil of FIG. 5a has no accelerator vanes as shown by the empty entrance zone 97. In FIGS. 5b and 5c, a full length tapered accelerator vane 145 and a truncated vane 147 is shown, respectively. These vanes deflocculate the pulp slurry by their strong agitating action, begin pumping the pulp downward into the screening chamber, and accelerate it to a velocity less than that of the rotor surface. This limits the magnitude of the pressure pulsations and thereby reduces fatigue stresses on the screen 95. Since the pressure pulse is proportional to the relative velocity of the foil with respect to the pulp, adjustments to the relative velocity (by locally including greater or lesser numbers of accelerating vanes) may be advisable at several axial locations in screening chamber 93, depending upon pulp consistency and type.

Figure 6:
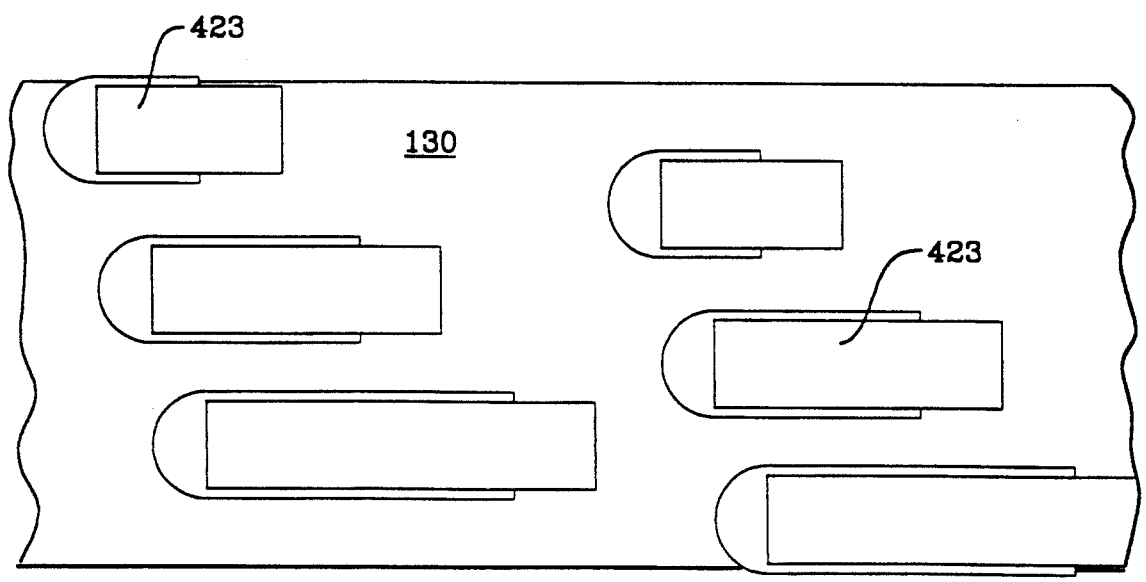
FIG. 6 is a view, as in FIG. 2, of another embodiment providing greater flexibility in placement of pulse-generating rotor surface projections.

FIG. 6 is a schematic view of an unrolled rotor surface showing another embodiment of the pulse generating projections of the present invention. Here, the projections or half-foils 423 are separate ramp-like protuberances and have a small axial extent on rotor surface 130. The semi-cylindrical leading edges of the half-foils each have a point of tangency to a spiral line projected onto the surface of the rotor so that, collectively, they describe a spiral inclination angle. These foil members are shown extending for different circumferential distances on the rotor surface to show a possible method of increasing the duration of the backwash pulses (as described for FIG. 4b) and also to illustrate the many possible forms and combinations which may be employed. In all cases, the leading edges of the foils project radially the greatest distance and taper down to the rotor surface, or even below the surface, at the trailing edges.

Figure 7A:
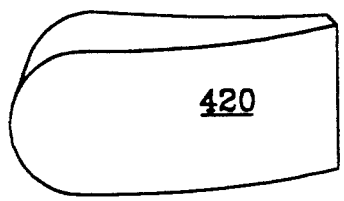
FIGS. 7a-7g show several different configurations of pulse-generating surface projections which can be used to vary the pulse characteristics as required by pulp properties.
Figure 7B:
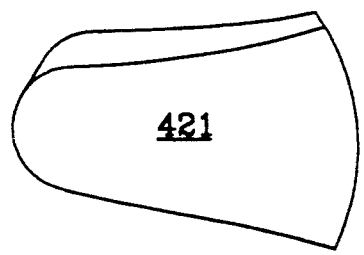
Figure 7C:
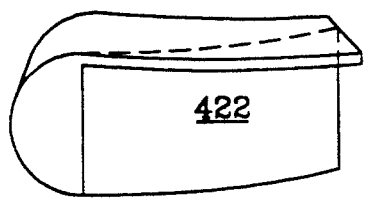
Figure 7D:
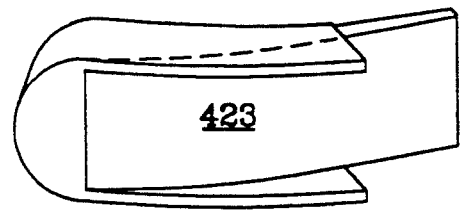
Figure 7E:
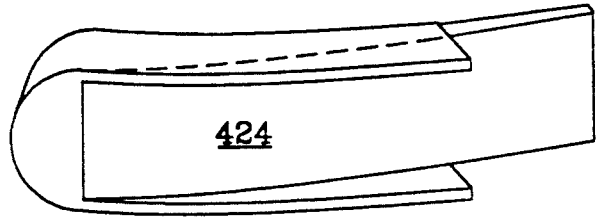
Figure 7F:
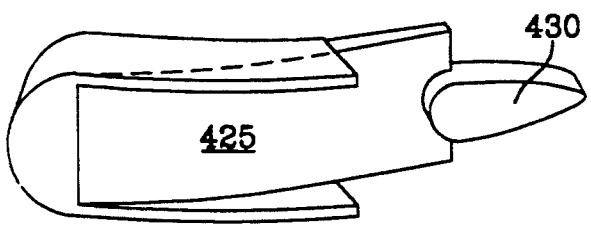
Figure 7G:
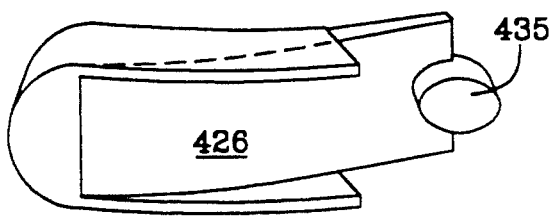

A number of geometries for this embodiment are illustrated in FIGS. 7a-g. In all cases, the leading-edge of the foil is substantially radially straight and perpendicular to the rotor surface as in the other embodiments described. In the axial direction, the half-foil leading-edge is rounded to shed any large scale contaminants either upward or downward to prevent wedging between the screenplate and the protuberance. The net downward flow of pulp slurry due to feed pressure transports these large particles downward through the screening chamber. FIG. 7a shows a foil 420 which causes a screen flow reversing pulse and creates mixing vortices at its trailing-edge due to axial flow of pulp into the low pressure zone behind the foil. Foil 421, in FIG. 7b, is fan shaped to increase the axial extent of the mixing vortices and to maintain the axial extent of the pulse while foil 422, in FIG. 7c, has a constant height barrier (or fence) along its upper edge to limit the amount of downward flow into the mixing vortices, hence, to reduce pulse attenuation and to maintain pulse pressure amplitude. The fence can be provided on the lower edge, as well, if the operating conditions warrant, or on both edges as in the cases of foils 423, 424, 425, and 426 shown in FIGS. 7d, 7e, 7f, and 7g. The two fence configuration causes the screen flow reversing pulse to last longer by delaying the axial inflow of pulp into the mixing vortices until passage of the trailing-edge of the half-foil. Excessive eddy-currents and intermixing behind the foils can be reduced by incorporation of flow dividers 430 and 435, as seen in FIG. 7f and 7g. These occupy space in the vortex regions to reduce the vigor of mixing.

The embodiments shown in FIGS. 2, 4a, 4b, 6, and 7a-7g all operate on the same principle, namely the venturi-like effect producing a low-pressure region due to the relative motion between the half-foil and the pulp next to the screen. This low-pressure region effectively travels around the screen causing a travelling flow reversal backwash wave through the screen to clear blockages due to coarse particles and agglomerates, shives, and pulp mat formation. In all embodiments, provision is made for circumferential distribution of the pressure reversal pulsations to avoid undue stressing of the screen. Because of the controlled timing, duration, and distribution of flow reversals produced by the present invention, self-dilution of the pulp slurry is achieved. This permits operation at increased consistency, increased specific capacity, and reduced specific power consumption. The required numbers and configurations of the half-foils (or surface protuberances) discussed are determined for the particular pulp being processed, and, therefore, the several embodiments are presented as equally useful, depending on the particular application. The embodiment which is best for one pulp type may well be less suitable for another.

This invention enhances the efficiency of screening for high consistency pulp by deflocculating and mixing the pulp as it passes through the pulp entrance chamber into the screening chamber, thereby assuring a uniformly dispersed suspension of fibers. Moreover, the generation of backwash flow through the screen apertures by the hydrodynamic foils offsets the normal thickening effect of screening by returning a fraction of pulp liquor having a reduced fiber content to the screening chamber. The foils extend a distance along the rotor circumference which is determined by the length of time during which flow reversal is required at the particular location (generally, backflows of longer duration, thus foils of greater length, are required at the downstream end of the screening chamber). The magnitude of the pressure reversal and the area of screen affected at any one time may be controlled by the radially outer contour and the axial and circumferential dimensions of the foil on the rotor surface. Because of the constant spiral angle of the foil leading edge, coarse particles are swept downstream through the screening chamber. The angle is preferably less than fifty degrees from the horizontal in order to provide minimal resistance to such transport and to preclude coarse particle retention in the screening chamber.

The projections are ramp-like protuberances having their ramp oriented to decrease toward the trailing edge. They may have a fence along the upstream or downstream edge, or both, to reduce crossflow and extend the duration of pressure reversal. The ramp angle should be such as to avoid boundary layer separation, i.e., stall condition, and to thereby maintain a more uniform amplitude of negative pressure for the desired time duration.

What is claimed is:

1. A hydrodynamic device for generating negative pressure excursions in a pulp slurry during fine screening, comprising:
    at least one half-foil member disposed on a substantially cylindrical outer surface of a rotor, said rotor being mounted within and co-axial with a substantially cylindrical screen having a circumferentially continuous apertured zone to define an annular screening chamber between said rotor and said screen, said at least one half-foil member having a collective axial extent at least equal to that of said apertured zone and having a collective leading edge of said at least one half-foil member inclined at a spiral angle relative to the axis of said rotor; and
    means for deflocculating the pulp slurry and for accelerating said pulp slurry to a desired circumferential velocity for screening, wherein the means for deflocculating and accelerating the pulp slurry comprises an extension on one or more of said at least one half-foil member, said extension projecting axially into a pulp entrance chamber in an upstream direction from said screening chamber and tapering from a maximum radial thickness of said half-foil at an upstream boundary of said screening chamber to a radially vanishing dimension near an upstream boundary of a pulp entrance chamber.

2. A hydrodynamic device for generating negative pressure excursions in a pulp slurry during fine screening, comprising:
    at least one half-foil member disposed on a substantially cylindrical outer surface of a rotor, said rotor being mounted within and co-axial with a substantially cylindrical screen having a circumferentially continuous apertured zone to define an annular screening chamber between said rotor and said screen, said at least one half-foil member having a collective axial extent at least equal to that of said apertured zone, a collective leading edge inclined at a spiral angle relative to the axis of said rotor, and a circumferential extent which continuously increases from a minimum at the upstream end of the screening chamber to a maximum at the downstream end thereof.

3. The hydrodynamic device of claim 1, wherein the leading edge of said foil member is inclined to the rotor axis at a spiral angle of twenty-five degrees to sixty-five degrees.

4. The hydrodynamic device of claim 1, wherein the leading edge of said foil member is inclined to the rotor axis at a spiral angle of more than forty-five degrees.

5. A hydrodynamic device for generating negative pressure excursions in a pulp slurry during fine screening, comprising:
    a plurality of half-foil members disposed on a substantially cylindrical outer surface of a rotor, said rotor being mounted within and co-axial with a substantially cylindrical screen having a circumferentially continuous apertured zone to define an annular screening chamber between said rotor and said screen, said half-foil members being so arrayed as to sweep across the full axial extent of the apertured zone of the screen with each revolution of the rotor, wherein said half-foil members are arranged on the rotor to overlap on their circumferential paths, wherein each member has a half-cylindrical leading edge for deflecting coarse particles axially and a ramp-like outboard surface tapering from a maximum radial dimension at said leading edge to a minimum dimension near a trailing edge, and wherein said half-foil members further comprise fence-like means on one or more axial edges for limiting axial flow of slurry into a zone of negative pressure near said trailing edge.

6. A rotor for a pulp fine-screening apparatus, comprising:
    a rotatable shaft upon which is constructed a supporting framework;
    a substantially disc-shaped first element mounted on a first end of said shaft;
    a substantially cylindrical hollow element fastened to said supporting framework and to said first element an extending therefrom toward a second end of said shaft; and
    means, on said cylindrical hollow element, for causing negative pressure excursions within a pulp slurry being screened, said means comprising at least one half-foil member disposed on the surface of the rotor, said at least one half-foil member having an axial extent substantially equal to that of said cylindrical hollow element and having a leading edge inclined at a spiral angle relative to the axis of said rotor, and an extension projecting axially toward said disc-shaped first element and tapering from a maximum radial thickness at said half-foil to a radially vanishing dimension near said disc-shaped first element.

7. A screening apparatus for paper-making pulp slurry comprising:
    a housing having a generally cylindrical shape, an axis, a pulp inlet chamber, a screening chamber downstream of said inlet chamber, a rejects chamber and discharge downstream of said screening chamber, an annular accepts chamber outboard of said screening chamber, and an accepts discharge in said accepts chamber;

a rotor having an outer substantially cylindrical surface and an axis co-axial with said housing;

a generally cylindrical apertured stationary screen member also co-axial with said housing and said rotor, said screen member having an inside diameter greater than an outside diameter of said rotor to define said screening chamber in a resulting annular space between said screen member and said rotor;

means on the outer surface of said rotor for generating negative pressure excursions within said screening chamber, thereby causing flow reversals through the apertures of said screen; and means for deflocculating the pulp slurry and for accelerating said pulp slurry to a desired circumferential velocity for screening said means for deflocculating and accelerating comprising an extension means on one or more of a series of half-foil members arrayed upon the cylindrical surface of said rotor, said extension projecting axially into an annular pulp entrance chamber upstream from said screening chamber.

8. The screening apparatus of claim 7, wherein said extension means has a radial extent equal to the maximum radial extent of said half-foil members adjacent to the upstream edge of the apertured portion of said screen member, said extension means tapering smoothly to a minimum radial extent at an upstream portion of said extension means.

9. A screening apparatus for paper-making pulp comprising:

a housing having a generally cylindrical shape, an axis, a pulp inlet chamber, a screening chamber downstream of said inlet chamber, a rejects chamber and discharge downstream of said screening chamber, an annular accepts chamber outboard of said screening chamber, and an accepts discharge in said accepts chamber;

a rotor having an outer substantially cylindrical surface and an axis co-axial with said housing;

a generally cylindrical apertured stationary screen member also co-axial with said housing and said rotor, said screen member having an inside diameter greater than an outside diameter of said rotor to define said screening chamber in a resulting annular space between said screen member and said rotor; and means on the outer surface of said rotor for substantially negative pressure excursions within said screening chamber, thereby causing flow reversals through the apertures of said screen, said means comprising one or more projections on the outer surface of said rotor, said projections collectively extending an axial distance at least substantially equal to the full length of said rotor, having a collective leading edge spiral inclination angle relative to the rotor axis, and a circumferential extent which increases continuously from a minimum at the top of said screening chamber to a maximum at the bottom of said screening chamber.

10. A rotor for a pulp fine-screening apparatus, comprising:

a rotatable shaft upon which is constructed a supporting framework;

a substantially disc-shaped first element mounted on a first end of said shaft;

a substantially cylindrical hollow element fastened to said supporting framework and to said first element and extending therefrom towards a second end of said shaft; and means, on said cylindrical hollow element, for causing negative pressure excursions within a pulp slurry being screened, said means comprising a plurality of half-foil members disposed on the surface of the cylindrical hollow element, said half-foil members having a collective axial extent substantially equal to that of said cylindrical hollow element, ramp-like outboard surfaces tapering from a maximum radial dimension near leading edges to a minimum radial dimension near trailing edges; and fence-like means on one or more axial edges for limiting axial flow of said slurry into zones of negative pressure near said trailing edges.

* * * * *